United States Patent

[11] 3,588,387

[72] Inventor Frank B. Smith
105 Highland Ave., Harrington Park, N.J. 07640

[21] Appl. No. 32,630
[22] Filed Apr. 28, 1970
[45] Patented June 28, 1971

[54] CUTOFF DEVICE FOR TELEPHONE TRANSMITTER
2 Claims, 5 Drawing Figs.

[52] U.S. Cl. 179/167
[51] Int. Cl. H04m 1/19
[50] Field of Search 179/167, 103

[56] References Cited

UNITED STATES PATENTS

| | | | |
|---|---|---|---|
| 1,386,744 | 8/1921 | van Lynden | 179/167 |
| 3,474,196 | 10/1969 | Bottos | 179/103 |
| 3,504,138 | 3/1970 | Bottos | 179/167 |
| 3,518,380 | 6/1970 | Brennan et al. | 179/167 |

*Primary Examiner*—William C. Cooper
*Attorney*—Samuelson and Jacob

ABSTRACT: A cutoff device for a telephone transmitter having a lever arm with a cam face to engage the contact side of the transmitter, in an "off" position to thereby move the transmitter out of electrical contact with at least one of the electrical leads and a spring biased to move the transmitter back into contact with the electrical leads in an "on" position.

PATENTED JUN 28 1971 3,588,387

INVENTOR
FRANK B SMITH
BY Samuelson & Jacob
ATTORNEYS

CUTOFF DEVICE FOR TELEPHONE TRANSMITTER

The invention relates to cutoff device for telephone transmitters and more particularly to such a device which lifts the transmitter out of contact with one of the electrical, output leads.

While the invention is generally directed toward use in the present day subsets in which the telephone transmitter and receiver are combined in a single housing, it is also possible to utilize the teachings of the invention with other telephone subsets.

Most prior art, telephone transmitter, cutoff devices break the electrical circuit by electrical switches or electromechanical switches which interrupt the electrical circuit at any of a number of points in the circuit. The instant invention utilizes a lever arm which breaks the electrical circuit by mechanically moving the transmitter so that at least one of the contacts on the transmitter is precluded from making contact with its associated electrical lead. A biasing element is provided to move the transmitter back to the "transmit" or "on" position when the lever arm is moved to its other position. The lever arm is provided with a cam surface juxtaposed with the rear of the transmitter and which is movable between a first position wherein the cam surface is out of contact with the rear of the transmitter and the transmitter is "on" and a second position in which the cam surface is in contact with the rear of the transmitter so as to break the electrical connection between at least one of the electrical leads and its associated contact and the transmitter is "off".

The lever arm and biasing means are, preferably, a part of a cap which replaces the cap which is normally supplied as a part of the telephone subscriber set or subset. It is an important object of the invention to provide a cutoff device for a telephone transmitter which mechanically moves the transmitter out of and into contact with at least one of the electrical leads in the subset.

It is a further object of the invention to provide a lever arm and a spring which cooperate to move the transmitter to the desired positions.

These and other objects, advantages, features and uses will be apparent during the course of the following description, when taken together with the accompanying drawings, wherein.

Figures 1, 2, 3:
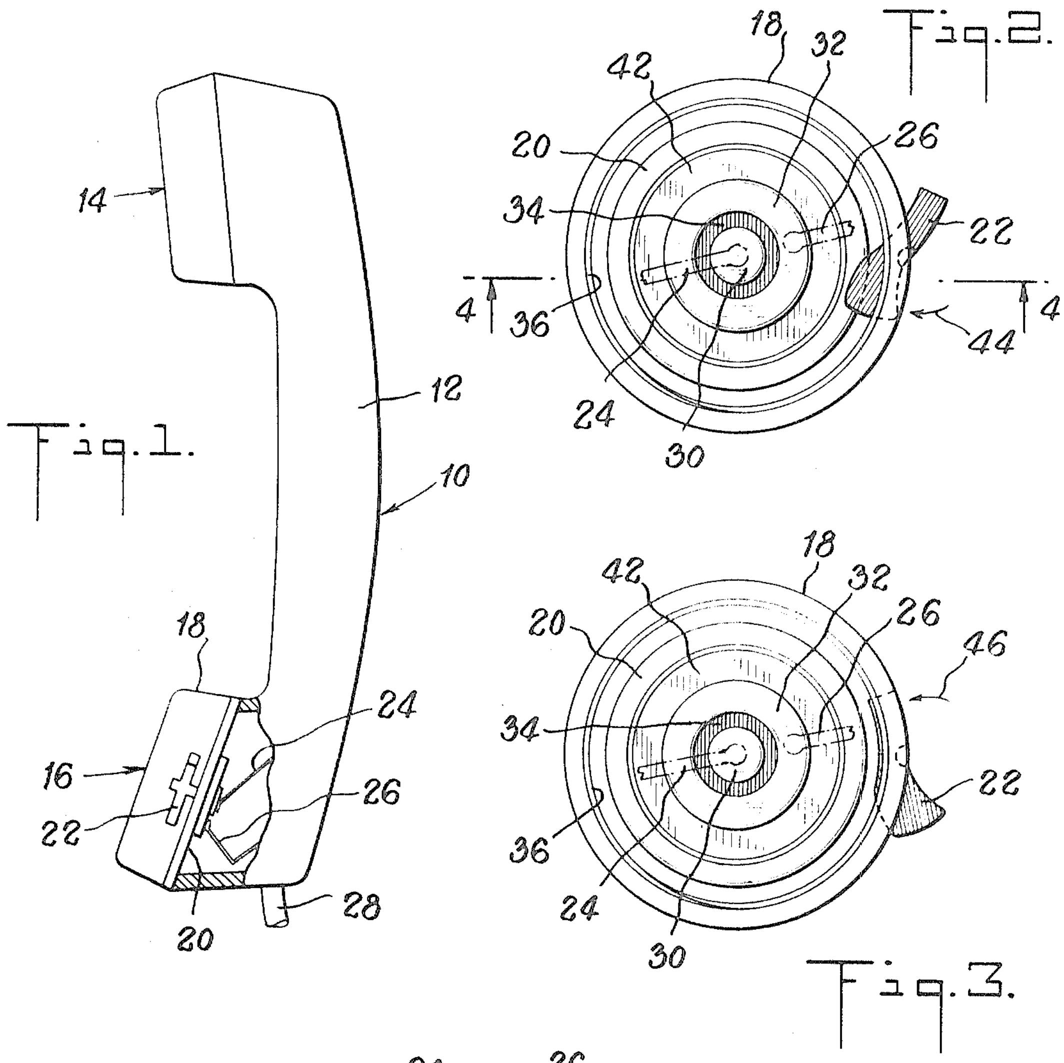
FIG. 1 is an elevational view, partly broken away, of a subset incorporating the device of the invention.
FIG. 2 is a view of the device of the invention in the "off" position, viewed in the direction of arrow 2 of FIG. 1.
FIG. 3 is a view, similar to that of FIG. 2, of the device of the invention in the "on" position.

In the drawings, wherein, for the purpose of illustration, is shown a preferred embodiment of the invention, the numeral 10 designates the handset of a telephone subset. Handset 10 comprises a housing 12, a receiver end 14 and a transmitter end 16. Since the receiver does not form any part of the invention, it is not described in detail. A cap 18, a transmitter 20 and a lever arm 22 which is mounted in cap 18 are installed in the cavity in the transmitter end 16. Electrical leads 24 and 26 are mounted in housing 12 and are brought out to the telephone system through cable 28 (details not shown). In normal, "on", operation, electrical lead 24 makes contact with contact 30 on the rear of transmitter 20 and electrical lead 26 makes contact with contact 32 on the rear of transmitter 20. Insulating ring 34 separates the contacts 30 and 32 from each other.

Figure 4:
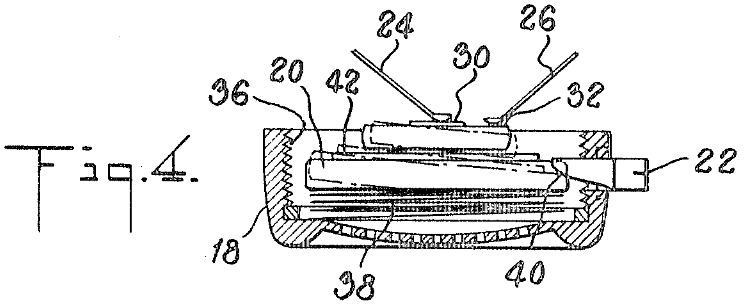
FIG. 4 is a sectional view taken on the lines 4–4 of FIG. 2, showing the transmitter in solid lines in the "on" position and in dot and dash lines in the "off" position.
Figure 5:
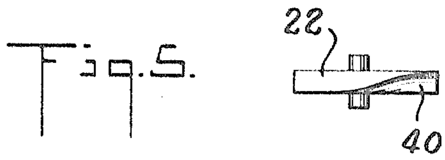
FIG. 5 is an elevational view of the lever arm used in the device of the invention.

Cap 18 is threaded to housing 12 as shown at 36 of FIG. 4 and resilient biasing means 38, shown preferably as a coil spring, is mounted between the cap and the front of transmitter 20. The front of transmitter 20 is provided with the usual diaphragm and cap 18 is provided with openings therein to permit acoustic waves to impinge on the diaphragm. Lever arm 22 is mounted in cap 18 and is provided with cam surface 40 which acts on the rear 42 of transmitter 20 as will be described hereafter.

To turn the transmitter off, that is, disconnect it from at least one of the electrical leads 24 or 26, lever arm 22 is moved in the direction of arrow 44 of FIG. 2. This causes the cam surface 40 to engage the rear 42 of transmitter 20 so as to break the electrical connection between contact 32 and electrical lead 26. The transmitter is off and the user may now converse with others in the room without the conversation's being heard by the person at the other end of the line. The "off" position is shown by the dot and dash lines of FIG. 4.

When it is desired to converse with the person at the other end of the line, the lever arm 22 is moved in the direction of arrow 46 of FIG. 3. This moves cam surface 40 out of contact with rear 42 of transmitter 20 and spring 38 pushes transmitter 20 toward the rear of the cavity so that both contacts 30 and 32 make contact with their associated electrical leads 24 and 26. The "on" position is shown by the solid lines of FIG. 4.

While a particular embodiment of the invention has been shown and described, it is apparent to those skilled in the art that modifications are possible without departing from the spirit of the invention and the scope of the subjoined claims.

The embodiments of the invention in which an exclusive property or privilege is claimed are defined as follows:

I claim:

1. In a telephone handset having a housing with a cavity therein to receive a transmitter and a pair of electrical leads contained therein and spaced so as to make contact with a pair of contacts on the rear of the transmitter and a cap cooperatively engaging the housing to hold the transmitter in position and permit acoustic waves to impinge on the diaphragm at the front of the transmitter, means for moving the transmitter between an "on" position wherein the pair of contacts makes electrical connection with the pair of electrical leads and an "off" position wherein at least one of the contacts is precluded from making contact with an electrical lead comprising:
   - a lever arm mounted in the housing adjacent the transmitter and having a cam surface juxtaposed with the rear of the transmitter movable between a first position wherein the cam surface is out of contact with the rear of the transmitter and a second position wherein the cam surface is in contact with the rear of the transmitter such that the transmitter is moved to thereby break the electrical connection between at least one of the contacts and one of the electrical leads; and
   - biasing means mounted within the housing to urge both contacts into electrical contact with the electrical leads when the switch is in the first position.

2. The invention of claim 1 wherein the biasing means comprises a coil spring mounted between the cap and the front of the transmitter.